Jan. 3, 1956   W. G. WORTH   2,729,102
FLOWMETER

Filed Oct. 1, 1951   2 Sheets-Sheet 1

INVENTOR.
W.G. WORTH, JR.

BY Hudson & Young

ATTORNEYS

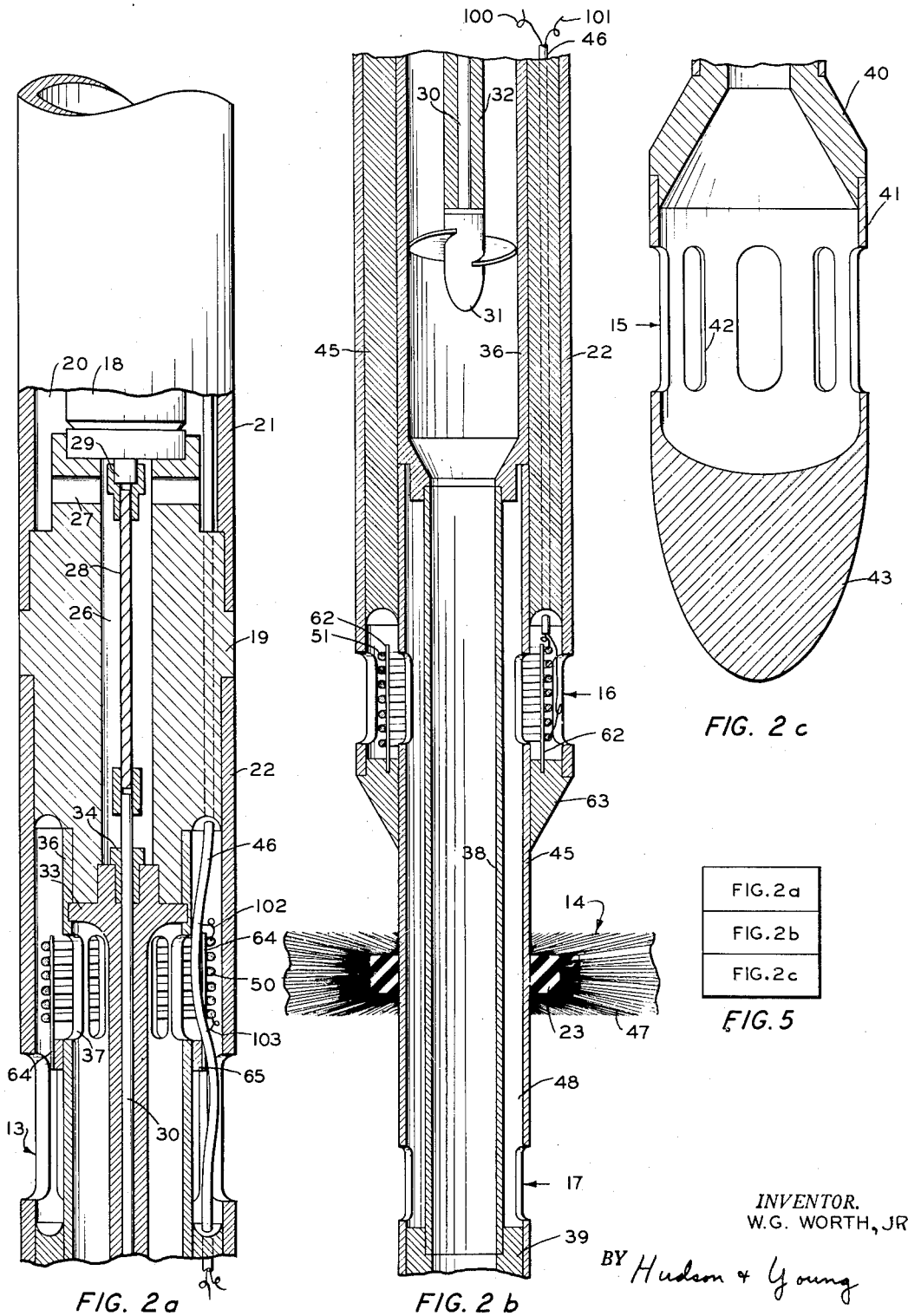

United States Patent Office 2,729,102
Patented Jan. 3, 1956

2,729,102

FLOWMETER

William G. Worth, Grand Prairie, Tex., assignor to Phillips Petroleum Company, a corporation of Delaware Application October 1, 1951, Serial No. 249,205

12 Claims. (Cl. 73—155)

This invention relates to flowmeters. In another aspect it relates to apparatus for measuring fluid flow rates in bore holes. In another aspect it relates to apparatus for determining the rate of fluid injection in a well. In still another aspect it relates to electrical circuitry for operating flowmeters within bore holes.

In certain petroleum operations it has been found desirable to inject fluids through a bore hole into adjacent earth formations. This is particularly true in water flooding operations in which water is pumped into a given bore hole under pressure, from which it enters the surrounding formations. It is of course desirable to have a measurement of the rate of fluid injection into the formations; and in order to provide such a measurement it has been proposed to position a flowmeter within the bore hole. Such a meter can be moved from point to point within the bore hole to indicate the total flow therepast at different depths. In addition to providing a meter which alters the flow characteristics as little as possible, for satisfactory operation, any apparatus positioned within a bore hole must be relatively simple and employ a minimum number of conducting cables to connect said apparatus wtih surface equipment. Most of the flowmeters known in the prior art do not adequately meet these requirements. In accordance with the present invention, however, there has been provided a simplified flowmeter which makes use of a balanced electrical bridge having a pair of adjacent resistance arms which are heated. The cooling effect of fluid flow past said resistance arms thereby tends to unbalance the bridge circuit so as to indicate the rate of flow through said first path. A second path is provided with a motor driven impeller for measuring fluid flow therethrough. The bridge circuit, together with an electrical motor for driving the water flow impeller, is connected to surface equipment adjacent the bore hole through a minimum number of electrical leads.

It is, accordingly, an object of this invention to provide apparatus for accurately measuring fluid flow.

Another object is to provide apparatus for determining at the surface of a bore hole the rate of fluid flow from within the bore hole into formations surrounding said bore hole.

It is a further object of this invention to provide a bore hole flowmeter in which the electrical connections between the surface equipment and the bore hole equipment require a minimum of electrical conductors.

A still further object is to provide apparatus for carrying out the above-mentioned objects which is simple to construct, easy to operate, and capable of giving accurate readings.

Various other objects, advantages and features of this invention should become apparent from the following detailed description taken in conjunction with the accompanying drawing in which:

Figure 1 illustrates water injection pumping and metering apparatus positioned within a bore hole;

Figures 2a, 2b, and 2c, collectively, are vertical sectional views taken along line 2—2 in Figure 1;

Figure 5 illustrates the arrangement of parts of Figures 2a, 2b, and 2c.

Figures 1, 3, 4:
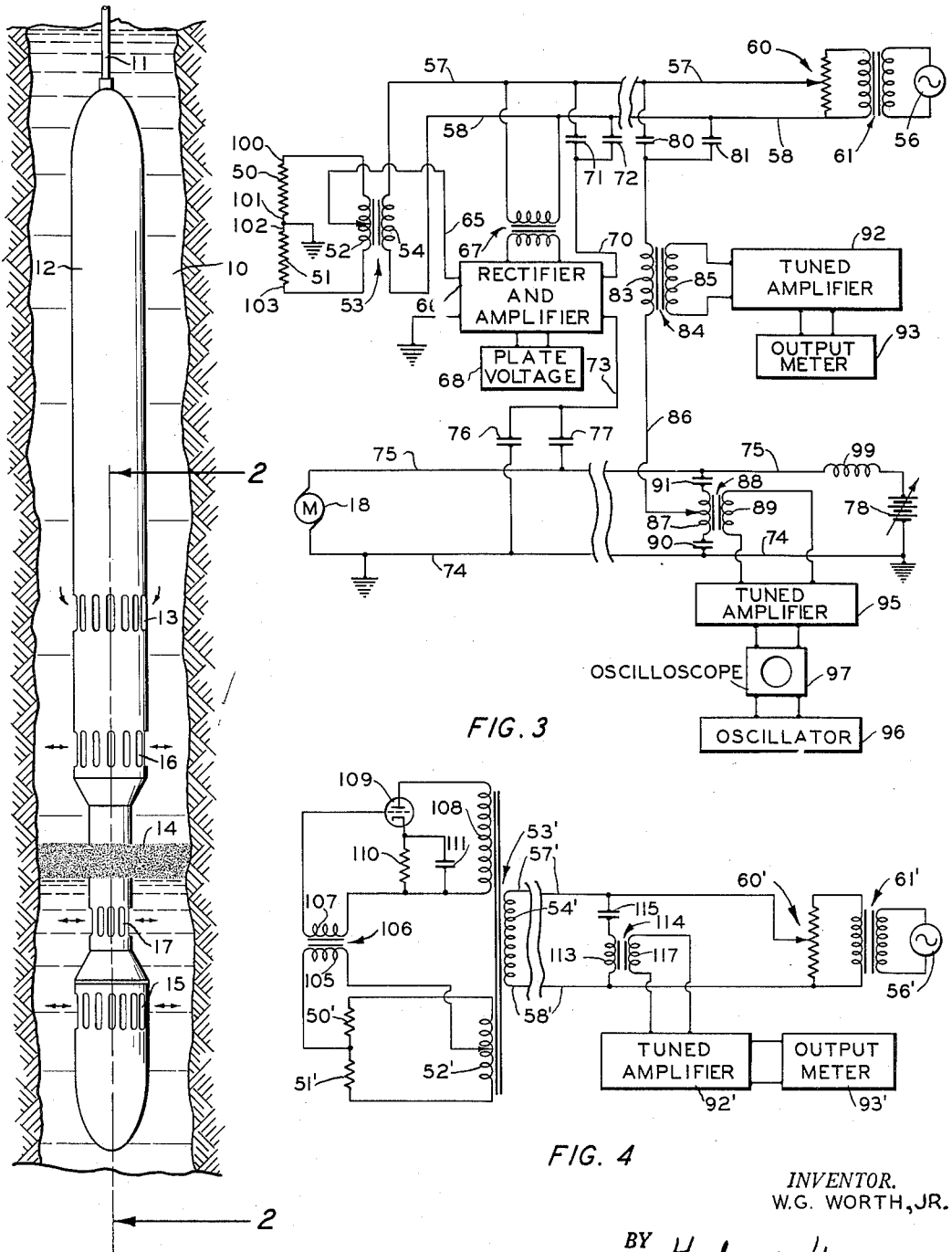
Figure 3 is a schematic electrical circuit diagram of a flowmeter positioned in part within the pumping and metering apparatus in Figures 1, 2a, 2b, and 2c.
Figure 4 is a schematic electrical circuit diagram of a second form of flowmeter.

Suitable metering apparatus for use in water injection operations is illustrated in Figure 1 of the drawing. This apparatus, which is supported within a section of a bore hole 10 by means of a cable 11, includes a motor-pump assembly 12 serving to measure fluid such as water which flows from an inlet 13 positioned above a packing device 14 to an outlet 15 below said packing device 14. A second by-pass flow path is provided by means of an interior passage which communicates with an opening 16 positioned above packing device 14 and an opening 17 positioned below said packing device, this passage having a flowmeter constructed in accordance with the present invention associated therewith to indicate the flow of liquid therethrough. When water flows through outlet 15 at a rate equal to the rate at which it enters the adjacent formation below packer 14 there is no flow in either direction through openings 16 and 17 or through the flowmeter associated with the passage connecting these outlets; that is, the flowmeter reading indicates the optimum rate at which water is being pumped into the formation.

The detailed construction of the metering apparatus is shown in Figures 2a, 2b, and 2c. Motor-pump assembly 12 includes a motor 18 positioned at the upper end of annular block 19, motor 18 being operated from a source of electrical energy located at the surface of the bore hole through suitable leads, not shown, carried by cable 11. Chamber 20 preferably is filled with an insulating liquid such as oil and contains pressure adjusting bellows, not shown, positioned above motor 18.

A passage 26 in annular member 19 communicates with chamber 20 through openings 27 in member 19. Passage 26 contains a flexible rod coupling 28 which connects the drive shaft 29 of motor 18 to an impeller rod 30 which carries a pump impeller 31. Rod 30 is maintained within a sleeve 32 having an integral flanged head 33 abutting annular member 19 and carrying a bearing 34 for impeller rod 30. The impeller 31 is housed within a tube 36 which is secured to annual member 19 at its upper end, and which is provided with openings 37 making up a portion of inlet 13. The lower end of tube 36 is joined to a smaller tube 38, which in turn is connected to a tubular member 39 having a flared lower portion 40 which receives an enlarged cylindrical discharge unit 41. Unit 41 is provided with openings 42 defining the outlet 15; said unit 41 also has an integral weight portion 43 tending to properly orient the apparatus in the bore hole. Mounted concentrically with tube 38 is a larger tube 45 carrying a packing device 14 which may be of any desired construction, but preferably is formed of an annular sleeve 23 of hard rubber carrying a set of radially extending bristles 47 extending outwardly to engage the walls of the bore hole, these bristles 47 being impregnated with a suitable sealing compound such as grease.

The above-described metering apparatus is of substantially the same form as the flowmeter described and claimed in the copending application of R. G. Piety, Serial No. 159,264, filed May 1, 1950, entitled Flowmeter. The present invention, however, resides not in this metering apparatus, but rather a particular form of flow indicating means adapted to measure the flow through a passage 48 which communicates with openings 16 and 17 as previously described.

The various circuit elements of a first embodiment of the flowmeter of the present invention are illustrated schematically in Figure 3. Those units to the left of the broken line are positioned in the pumping apparatus located within the bore hole, while those elements to the right of the broken line are positioned at the surface.

The flowmeter consists essentially of a bridge circuit having like thermal resistance elements 50 and 51 connected in series relationship with the secondary coil 52 of a transformer 53. The primary coil 54 of transformer 53 is connected to an alternating current voltage source 56 positioned at the surface of the bore hole by means of electrical conductors 57 and 58, potential divider 60, and transformer 61. Resistance elements 50 and 51 are housed within the pumping apparatus illustrated in Figures 2a and 2b, respectively. Resistance element 51 is shaped in the form of a helix and mounted adjacent opening 16 on a plurality of spaced support rods 62, which in turn are secured to an annular member 63 positioned between cylindrical member 45 and casing 22. Resistance element 50 is mounted in like manner adjacent opening 13 on a plurality of spaced support rods 64 secured to annular member 65. The two end terminals of resistors 50 and 51, which are connected to one another by leads 101 and 102, respectively, are maintained at ground potential; an electrical lead 65 connects the center tap of coil 52 to the input of a full wave rectifier-amplifier unit 66.

Since thermal resistance elements 50 and 51 have equal ohmic resistance, the bridge circuit including said elements and transformer coil 52 is in a condition of electrical balance, that is, there being no potential difference between the center tap of coil 52 and the common ground between elements 50 and 51 when equal quantities of cooling fluid are flowing past said elements 50 and 51, with the result that a zero input signal is applied to unit 66. However, any deviation from equal fluid flows varies the resistance of said elements 50 and 51 due to the relative cooling effect of the two unequal flows therepast. This, in turn, results in an unbalance of the bridge circuit with a signal voltage being applied to unit 66. The bridge circuit conveniently is operated from a readily available 60 cycle power source. Unit 66 consists of a full wave rectifier and amplifier of conventional design. Thus, the 60 cycle unbalanced bridge input signal is converted to a unidirectional 120 cycle output signal of amplitude proportional to the degree of unbalance of the input bridge circuit. Electrical energy to heat the filaments of the vacuum tubes in unit 66 is supplied by means of a transformer 67 connected across leads 57 and 58, and the plate voltage supply batteries for unit 66 are contained in a suitable housing 68.

One output lead 70 of unit 66 is applied to conductors 57 and 58 through capacitors 71 and 72, respectively; and the second output lead 73 of unit 66 is applied to a second pair of conductors 74 and 75, also traversing the bore hole, through capacitors 76 and 77, respectively. Conductors 74 and 75 further serve to connect motor 18 with a source of variable direct current operating voltage 78 positioned at the surface. The output signal of unit 66, which is phantomed on the pairs of conductors 57, 58 and 74, 75, is measured at the surface of the bore hole to give an indication of the relative fluid flow past resistors 50 and 51. This measuring circuit can be traced through capacitors 80 and 81, which couple one end terminal of the primary coil 83 of transformer 84 to conductors 57 and 58, respectively; and through lead 86 which connects the second end terminal of coil 83 to the center tap of coil 87 of transformer 88. The end terminals of coil 87 are connected to conductors 74 and 75 through capacitors 90 and 91, respectively. Thus, the output signal of unit 66 is applied through transformer 84 to the input of amplifier 92, which is tuned to pass the 120 cycle rectified bridge circuit signal. The output of amplifier 92 is connected to a suitable indicating meter 93. Such indicating meters are well known to those skilled in the art and preferably is in the form of a rectifier and direct current recording instrument.

In order to measure the speed of motor 18, there, is employed an indicating circuit including amplifier 95, oscillator 96, and oscilloscope 97. The input signal to amplifier 95 is taken from transformer 88 and comprises the commutator ripple of direct current motor 18. Amplifier 95 is tuned to reject stray signals having frequencies outside the range of the fundamental commutator ripple, with the result that the output signal applied to oscilloscope 97 is of the frequency of the commutator ripple. A known variable frequency output signal from oscillator 96 also is applied to oscilloscope 97, the latter being varied in frequency until equal to the commutator ripple frequency as indicated by the resulting Lissajou figure on the oscilloscope. The amount of water passing impeller 31 is of course proportional to the speed of operation of motor 18 and can readily be calculated therefrom. Optionally, the amount of water passed can be calculated from a measurement of the electrical energy consumed by said motor.

From the above description it should be apparent that the circuit illustrated in Figure 3 readily accomplishes one of the objects of this invention, namely, the reduction of connecting leads traversing the bore hole. The three independent circuits, the bridge heating circuit, the motor circuit, and the bridge unbalance detecting circuit, are connected through the bore hole by means of four electrical conductors. By phantoming the output signal from the bridge circuit onto both the bridge heating circuit and the motor circuit, separate leads therefor have been eliminated. The circuit path of this output bridge unbalance signal can be traced from unit 66 through lead 70, over the parallel paths comprising conductors 57 and 58, through coil 83 of transformer 84, through the parallel paths comprising conductors 74 and 75, and back to unit 66 over lead 73. By applying this output signal to the two parallel conductor paths through capacitors such as 71, 72 and 76, 77, undesired coupling effects between the conducting cables are minimized. In the motor circuit a choke coil 99 is inserted in series with voltage source 78 to eliminate alternating current signals therefrom. Electrical cables adapted for suspending pumping apparatus within a bore hole are readily available containing three insulated electrical conductors surrounded by a metallic sheath. These three insulated conductors can be conductors 57, 58, and 75 with the grounded metallic sheath serving as conductor 74. The various circuit components positioned within the metering apparatus, such as transformers 53 and 67, rectifier-amplifier unit 66, capacitors 71, 72, 76, and 77, and battery housing 68, all can be positioned within a suitable fluid-tight housing, not shown, which is located in chamber 20 above motor 18. Suitable conducting leads such as 100, 101, 102, and 103 serve to connect resistance elements 50 and 51 into the circuit network.

Operation of motor 18 rotates impeller 31 which is positioned within the path from inlet 13 through tubes 36, 38, and 39 to the discharge openings 42 of outlet 15. In this regard it should be noted that the flow through the foregoing path is created primarily by the pressure on the fluid in region 10, which is established by suitable pumping apparatus (not shown) positioned at the surface of the bore hole, rather than by operation of impeller 31. Impeller 31 adds sufficient energy to the flow of fluid therepast to equalize the pressures on both sides of packer 14. The second by-pass flow path is provided through inlet 16, past bridge resistor 51, through opening 48, and finally out opening 17, or in the reverse direction. Under conditions of zero flow through the by-pass path the bridge circuit will be at a condition of maximum unbalance. However, any flow past resistance element 51 cools said element to reduce the degree of bridge unbalance; this, in turn is indicative of the rate of fluid flow therepast. Resistor 50, which is positioned within the path of flow created by impeller 31, is maintained at substantially a constant reference temperature. When water flows past impeller 31 at an optimum rate there is no pressure drop across packer 14 so that the flow through by-pass channel 48 is zero as indicated by maximum unbalance of the bridge circuit. At this position the speed of motor 13 is determined and, by knowing the water flowing past impeller 31 as a function of impeller 31 and the speed of motor 18, the amount of water being pumped into the adjacent formations becomes apparent.

In Figure 4 there is illustrated a modified form of the bridge unbalance detecting circuit in which parts similar to those illustrated in Figure 3 are designated by like primed reference numerals. The bridge circuit made up of resistance elements 50', 51', and transformer coil 52 functions in the same manner as does its counterpart of Figure 3, with the exception that any unbalance current flow takes place through the primary coil 105 of transformer 106 rather than to unit 66 of Figure 3. Coil 105 is connected directly between the center tap of coil 52' and the common junction of resistance elements 50' and 51'. A third coil 108 also is wound on transformer 53 having a first end terminal thereof being directly connected to the anode of a vacuum tube triode 109. The second end terminal of coil 108 is connected to the cathode of triode 109 through cathode resistor 110. A by-pass capacitor 111 is connected in parallel with resistor 110. The secondary coil 107 of transformer 106 is applied to the second end terminal of coil 108 and to the control grid of tube 109. Coils 107 and 108 are in such phase relationship that the center grid and anode of tube 109 are in phase with one another.

It should be apparent that tube 109 thereby functions as a rectifying element so that a pulsing unidirectional current flows through coil 108. This pulsing direct current flow is controlled by the voltage applied to the grid of tube 109 through transformer 106, while the voltage applied across transformer 106, in turn, is directly proportional to the unbalance of the bridge circuit. Since the grid and plates of tube 109 are in phase with one another the amplitude of current flowing through coil 108 is proportional to the unbalance of the bridge circuit. The pulsing unidirectional current flowing through winding 108 tends to saturate the core of transformer 53' thereby resulting in a distorted current wave form in winding 54' of said transformer. This distortion of the voltage signal is due primarily to the second harmonic present therein, and the magnitude of second harmonic is proportional to the unbalance of the bridge circuit. By measuring this second harmonic at the surface of the bore hole there is obtained an indication of the degree of unbalance of the bridge. Suitable measuring means again can take the form of amplifier 92' and output meter 93'. As illustrated, the primary coil 113 of transformer 114 and capacitor 115 are connected in series relationship with winding 54', and are of such values as to be resonant to the frequency of the second harmonic current flowing therethrough. The output winding 117 of transformer 114 is applied to amplifier 92' which is tuned to this second harmonic. A second method which can be used to pick up this second harmonic signal component is to have capacitor 115 shunting coil 113 with the two elements being in parallel resonance to the second harmonic frequency.

If the second form of unbalance bridge detection circuit illustrated in Figure 4 is employed, the motor circuit illustrated in Figure 3 is a completely separate circuit and in no way coupled to the bridge detecting circuit. Such an arrangement also requires a maximum of four conductors traversing the bore hole.

While the flowmeter of the present invention has been described in conjunction with a particular pumping apparatus for use in water injection operations it should be apparent that the invention is in no way limited to such an application. For example, the flow through any two parallel paths can be compared or the total flow through one path can be measured by this flowmeter. The particular arrangement of parts herein described should be considered by way of illustration and not as limiting the invention thereto.

Having described my invention, I claim:

1. Apparatus for measuring the rate of fluid flow through a passage comprising a structure adapted to be positioned within the passage, packing means extending outwardly from said structure to engage the walls of the passage to divide the passage into first and second regions, first conduit means carried by said structure to communicate between said first and second regions, second conduit means carried by said structure to communicate between said first and second regions, a first thermal sensitive impedance element, a second impedance element, said first element being positioned in said first conduit means, said second element being positioned externally of said first conduit means, means forming an electrical bridge circuit having said first and second elements in adjacent arms thereof, said bridge circuit having first and second pairs of opposite terminals, a source of voltage applied across the first opposite terminals of said bridge circuit, means for measuring the signal between the second opposite terminals of said bridge circuit, said signal being indicative of fluid flow through said first conduit means, an impeller positioned in said second conduit means, a motor to rotate said impeller to direct fluid through said second conduit means at a rate so that the flow through said first conduit means is zero, and means to measure the speed of rotation of said impeller, the speed of rotation of said impeller being a measure of the rate of fluid flow through said second conduit means when the indicated flow through said first conduit means is zero.

2. Apparatus for measuring fluid flow between isolated regions of a bore hole comprising, in combination, a housing adapted to be disposed in a bore hole, a packer attached to said housing and extending outwardly therefrom to engage the walls of the bore hole in fluid-tight engagement, first conduit means extending through said housing to communicate with regions of the bore hole above and below said packer, second conduit means extending through said housing to communicate with regions of the bore hole above and below said packer, first and second thermal sensitive impedance elements, said first element being positioned in said first conduit means, said second element being positioned in said second conduit means, a transformer, a source of fluctuating voltage applied across a primary coil of said transformer, said first and second elements being connected in series relationship with the secondary coil of said transformer, output terminals connected to a center tap on said secondary coil and to the junction between said first and second elements, respectively, means for measuring the signal between said output terminals, said signal being indicative of relative fluid flows through said first and second conduit means, an impeller positioned in said second conduit means, a motor to rotate said impeller to direct fluid through said second conduit means at a rate so that the flow through said first conduit means is zero, and means to measure the speed of rotation of said impeller, the speed of rotation of said impeller being a measure of the rate of fluid flow through said second conduit means when the indicated flow through said first conduit means is zero.

3. Apparatus for measuring fluid flow between isolated regions of a bore hole comprising, in combination, a housing adapted to be disposed in a bore hole, a packer attached to said housing and extending outwardly therefrom to engage the walls of the bore hole in fluid-tight engagement, first conduit means extending through said housing to communicate with regions of the bore hole above and below said packer, second conduit means extending through said housing to communicate with regions of the bore hole above and below said packer, first and second thermal sensitive resistance elements, said first elements being positioned in said first conduit means, said second element being positioned in said second conduit means, said first and second elements being connected in series relation, a transformer having the secondary coil thereof connected across said resistance elements, a rectifier having the input terminals thereof connected between a center tap on the secondary coil of said transformer and the junction between said first and second resistance elements, respectively, a first amplifier having the input terminals thereof connected to the output terminals of said rectifier, an impeller positioned in said second conduit means, and a direct current motor connected to said impeller to rotate said impeller, all of the foregoing circuit elements being positioned in said housing; a cable secured to said housing to suspend same in a bore hole; a source of alternating current, a second amplifier tuned to pass frequencies of the second harmonic of said alternating current source, a meter connected to the output terminals of said second amplifier, a source of direct current to operate said direct current motor, a third amplifier tuned to pass frequencies in the range of the frequency of the commutator ripple of said motor as said motor is operated, an oscilloscope having one set of deflection plates thereof connected to the output terminals of said third amplifier, and a variable frequency oscillator, the output terminals thereof being connected to a second set of deflection plates of said oscilloscope, said current sources, second and third amplifiers, meter, oscilloscope, and oscillator being positioned at the surface of the bore hole; and first, second, third, and fourth electrical leads extending through said cable between said elements positioned in the bore hole and said elements positioned at the surface, said first and second leads connecting said alternating current source across the primary coil of said transformer, said third and fourth leads connecting said direct current source to said motor, a choke coil connected in series with the last-mentioned circuit, first and second capacitors coupling one of the output terminals of said first amplifier to respective ones of said first and second leads, second and third capacitors coupling the second output terminal of said first amplifier to respective ones of said third and fourth leads, a second transformer, the end terminals of the secondary coil of said second transformer being connected to the input terminals of said second amplifier, fifth and sixth capacitors coupling one end terminal of the primary coil of said second transformer to respective said first and second leads, a third transformer, the end terminal of the secondary coil of said third transformer being connected to the input terminals of said third amplifier, seventh and eighth capacitors coupling respective end terminals of the primary coil of said third transformer to respective ones of said third and fourth leads, and a lead connecting the second end terminal of the primary coil of said second transformer to a center tap on the primary coil of said third transformer, the speed of rotation of said impeller being a measure of the rate of fluid flow through said second conduit means when said impeller is operated at a rate so that the indicated flow through said first conduit means is zero.

4. The combination in accordance with claim 1 wherein said means for measuring the signal between said second terminals comprises means for establishing an output signal proportional in magnitude to the signal between said second terminals but differing in frequency therefrom, and means to measure the magnitude of said output signal.

5. The combination in accordance with claim 1 wherein said means for measuring the signal between said second terminals comprises a full-wave rectifier having the input terminals thereof connected to said second terminals, and means to measure the output signal from said full-wave rectifier.

6. The combination in accordance with claim 2 wherein said means for measuring the signal between said output terminals comprises a vacuum tube having at least an anode, a cathode and a control grid, a second secondary coil on said transformer, means for applying the voltage across said second secondary coil between said anode and cathode, means for applying said signal between said control grid and cathode, and means to measure the output signal of said vacuum tube.

7. The combination in accordance with claim 2 wherein said means for measuring the signal between said output terminals comprises means for establishing a second output signal proportional in magnitude to the signal between said output terminals but differing in frequency therefrom, and means to measure the magnitude of said second output signal.

8. The combination in accordance with claim 2 wherein said means for measuring the signal between said output terminals comprises a full-wave rectifier having the input terminals thereof connected to said output terminals, and means to measure the output signal from said full-wave rectifier.

9. The combination in accordance with claim 2 wherein said means for measuring the signal between said output terminals comprises a vacuum tube having at least an anode, a cathode and a control grid, a second secondary coil on said transformer, means for applying the voltage across said second secondary coil between said anode and cathode, means for applying said signal between said control grid and cathode, and means to measure the output signal of said vacuum tube.

10. The combination in accordance with claim 2 wherein said first and second impedance elements, said transformer, and said motor are disposed at a first location; and said source of voltage, said means for measuring said signal, and said means to measure the speed of rotation of said impeller are disposed at a second location; further comprising a first circuit to connect said source of voltage to said transformer; a second source of voltage disposed at said second location; and a second circuit to connect said second source of voltage to said motor; said means for measuring said signal being connected to said output terminals in part by said first circuit and in part by said second circuit.

11. The combination in accordance with claim 2 wherein said first and second resistance elements, said transformer, and said motor are disposed within said housing in a well bore; and said source of voltage, said means for measuring said signal, and said means to measure the speed of rotation of said impeller are disposed at the surface of said bore hole; further comprising a first circuit to connect said source of voltage to said transformer; a second source of voltage disposed at the surface of said bore hole; and a second circuit to connect said second source of voltage to said motor; said means for measuring said signal being connected to said output terminals in part by said first circuit and in part by said second circuit.

12. The combination in accordance with claim 1 wherein said impeller speed measuring means comprises an oscilloscope, means for applying a signal representing the commutator ripple of said motor to one set of the deflection plates of said oscilloscope, and a second voltage of variable frequency applied to a second set of the deflection plates of said oscilloscope thereby forming a Lissajou figure with said signal representing said commutator ripple.

References Cited in the file of this patent

UNITED STATES PATENTS

| | | |
|---|---|---|
| 1,652,472 | Erwin | Dec. 13, 1927 |
| 1,935,445 | Heinz | Nov. 14, 1933 |
| 2,412,471 | Olson | Dec. 10, 1946 |
| 2,488,580 | Burleigh, Jr. | Nov. 22, 1949 |
| 2,517,455 | Waters | Aug. 1, 1950 |
| 2,524,150 | Vincent | Oct. 3, 1950 |
| 2,580,182 | Morgan et al. | Dec. 25, 1951 |
| 2,588,748 | Niles et al. | Mar. 11, 1952 |
| 2,620,658 | Piety | Dec. 9, 1952 |